US011887256B2

(12) United States Patent
Bertel et al.

(10) Patent No.: US 11,887,256 B2
(45) Date of Patent: Jan. 30, 2024

(54) DEFERRED NEURAL RENDERING FOR VIEW EXTRAPOLATION

(71) Applicant: Fyusion, Inc., San Francisco, CA (US)

(72) Inventors: Tobias Bertel, San Francisco, CA (US); Yusuke Tomoto, Millbrae, CA (US); Srinivas Rao, San Francisco, CA (US); Krunal Ketan Chande, San Francisco, CA (US); Rodrigo Ortiz-Cayon, San Mateo, CA (US); Stefan Johannes Josef Holzer, San Francisco, CA (US); Christian Richardt, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 17/516,136

(22) Filed: Nov. 1, 2021

(65) Prior Publication Data

US 2022/0139036 A1    May 5, 2022

Related U.S. Application Data

(60) Provisional application No. 63/110,017, filed on Nov. 5, 2020, provisional application No. 63/110,010, filed on Nov. 5, 2020.

(51) Int. Cl.
*G06T 17/20* (2006.01)
*G06T 15/04* (2011.01)
(Continued)

(52) U.S. Cl.
CPC ............ *G06T 17/20* (2013.01); *G06F 18/217* (2023.01); *G06N 3/045* (2023.01); *G06T 15/04* (2013.01); *G06V 10/751* (2022.01)

(58) Field of Classification Search
CPC .............................. G06T 17/20; G06T 15/04
See application file for complete search history.

(56) References Cited

U.S. PATENT DOCUMENTS

2017/0064200 A1    3/2017  Castillo
2017/0084001 A1    3/2017  Holzer
(Continued)

FOREIGN PATENT DOCUMENTS

KR          20190078292 A       7/2019

OTHER PUBLICATIONS

International Search Report and Written Opinion for App. No. PCT/US2021/057575, dated Feb. 25, 2022, 9 pages.

*Primary Examiner* — Samantha (Yuehan) Wang
(74) *Attorney, Agent, or Firm* — Kwan & Olynick LLP

(57) ABSTRACT

Novel images may be generated using an image generator implemented on a processor. The image generator may receive as input neural features selected from a neural texture atlas. The image generator may also receive as input one or more position guides identifying position information for a plurality of input image pixels. The novel images may be evaluated using an image discriminator to determine a plurality of optimization values by comparing each of the plurality of novel images with a respective one of a corresponding plurality of input images. Each of the novel images may be generated from a respective camera pose relative to an object identical to that of the respective one of the corresponding plurality of input images. The image generator and the neural features may be updated based on the optimization values and stored on a storage device.

20 Claims, 9 Drawing Sheets

(51) Int. Cl.
  *G06V 10/75* (2022.01)
  *G06F 18/21* (2023.01)
  *G06N 3/045* (2023.01)

(56) References Cited

U.S. PATENT DOCUMENTS

| | | | |
|---|---|---|---|
| 2018/0068463 A1* | 3/2018 | Risser | G06T 7/45 |
| 2020/0035016 A1* | 1/2020 | Muller | G06N 3/10 |
| 2020/0236296 A1 | 7/2020 | Holzer | |
| 2020/0279428 A1 | 9/2020 | Guay | |
| 2021/0358095 A1* | 11/2021 | Arroyo | G06T 5/50 |

* cited by examiner

DEFERRED NEURAL RENDERING FOR VIEW EXTRAPOLATION

PRIORITY CLAIM

The present application claims priority under 35 U.S.C. 120 to U.S. Patent App. No. 63/110,010, titled "DEFERRED NEURAL RENDERING FOR VIEW EXTRAPOLATION", filed Nov. 5, 2020 by Holzer and U.S. Patent App. No. 63/110,017, titled "CASUAL REAL-WORLD VR USING LIGHT FIELDS", filed Nov. 5, 2020 by Holzer, which are hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the image processing, and more specifically to generating novel images.

BACKGROUND

Conventional photo-realistic rendering requires intensive manual and computational effort to create scenes and render realistic images. Thus, creation of rendered content for high quality digital imagery using conventional techniques is largely limited to experts. Further, highly-realistic rendering using conventional techniques requires significant computational resources, typically substantial amounts of computing time on high-resource computing machines.

Overview

According to various embodiments, methods, systems, and computer readable media described herein may provide for the generation of novel images. In some implementations, a plurality of novel images may be generated using an image generator implemented on a processor, the image generator receiving as input a plurality of neural features selected from a neural texture atlas, the image generator also receiving as input one or more position guides identifying position information for a plurality of input image pixels.

In some embodiments, the plurality of novel images may be evaluated using an image discriminator implemented on the processor to determine a plurality of optimization values, the image discriminator comparing each of the plurality of novel images with a respective one of a corresponding plurality of input images, each of the plurality of novel images being generated from a respective camera pose relative to an object identical to that of the respective one of the plurality of input images.

In some embodiments, the image generator and the neural features may be updated based on the optimization values. The updated neural features may be stored on a storage device. The updated neural features may support the generation of a designated novel image from a designated camera pose different from any of the plurality of input images.

In some embodiments, the image generator may receive as input a plurality of background images, each of which may be associated with a respective one of the plurality of input images. The plurality of background images may be generated by removing the object from the plurality of input images.

In some embodiments, the image generator may receive as input a three-dimensional mesh representing the object in a three-dimensional coordinates space. The three-dimensional mesh may be generated based on the plurality of input images.

In some embodiments, the one or more position guides may include a respective plurality of normal vectors for a designated one of the input images. Each of the normal vectors may identify a three-dimensional direction orthogonal to a surface of the three-dimensional mesh at a respective position in the three-dimensional coordinate space.

In some embodiments, the one or more position guides may include a respective plurality of position values for a designated one of the input images. Each of the plurality of position values may identify a position in the three-dimensional coordinate space associated with a respective pixel position in the designated input image.

In some embodiments, the one or more position guides may include an optical center associated with a designated one of the input images. The optical center may indicate an approximate location in the three-dimensional coordinate space at which light rays that form the designated input image intersect.

In some embodiments, generating the plurality of novel images may involve determining a plurality of uv-maps. Each of the uv-maps may provide a correspondence between pixel locations in a respective one of the novel images and locations in the neural texture atlas.

In some embodiments, the image discriminator may be updated based on the optimization values. Each neural feature may include a plurality of values. Together the image generator and the image discriminator may form a generative adversarial network.

BRIEF DESCRIPTION OF THE DRAWINGS

The included drawings are for illustrative purposes and serve only to provide examples of possible structures and operations for the disclosed inventive systems, apparatus, methods and computer program products for synthetic view rendering. These drawings in no way limit any changes in form and detail that may be made by one skilled in the art without departing from the spirit and scope of the disclosed implementations.

DETAILED DESCRIPTION

Figure 1:
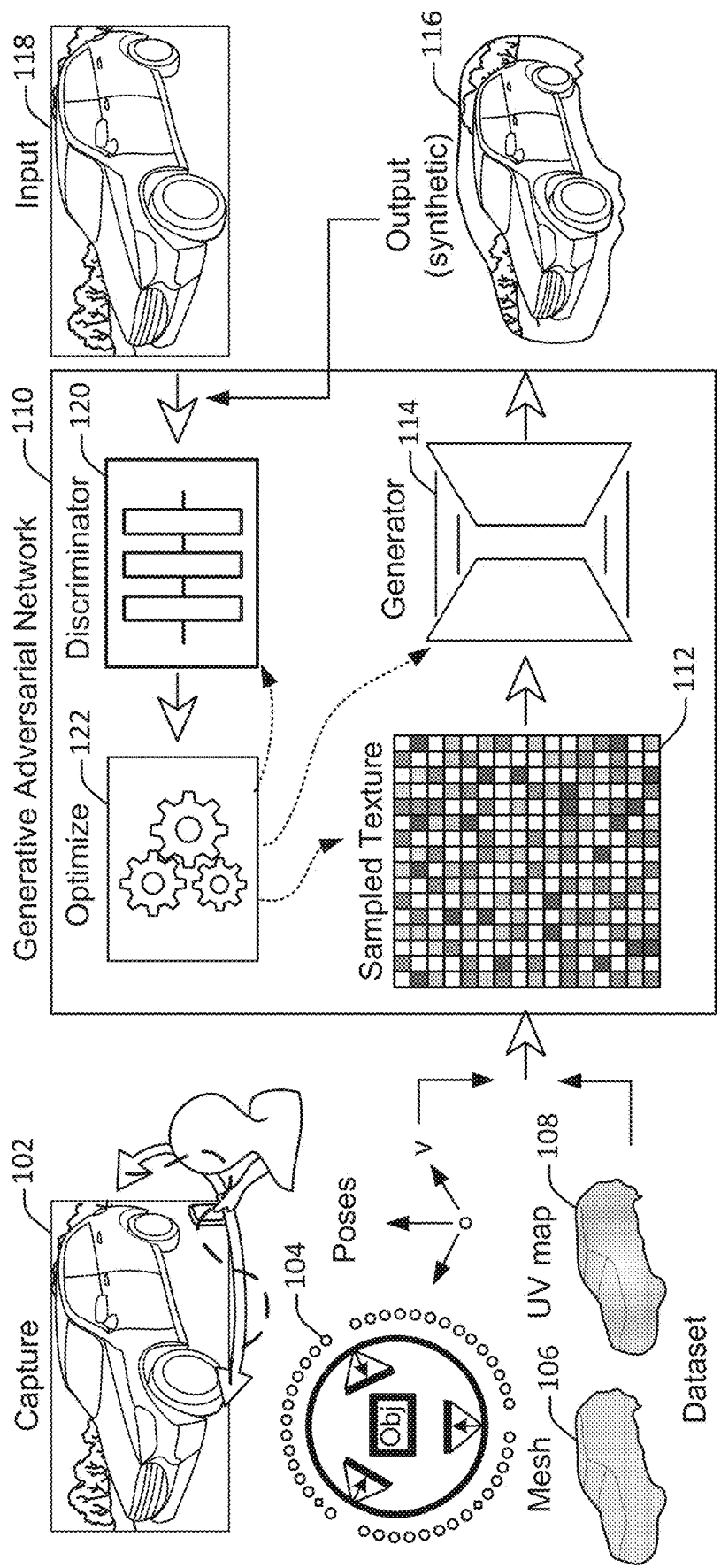
FIG. 1 illustrates an example of a rendering procedure, performed in accordance with one or more embodiments.

According to various embodiments, techniques and mechanisms described herein provide for the synthesis of novel camera views based on casually captured image data. Image data may be casually captured from a hand-held camera such as those available on smart phones. Then, view synthesis techniques may be used to construct novel views of real-world environments from a viewpoint different than any of the captured image data. Such novel views may be constructed as two-dimensional static images, video imagery, virtual reality imagery (e.g., two nearby perspectives), or some combination thereof.

Conventional image-based rendering methods that support visually pleasing specular surface reflections typically require accurate surface geometry and a large number of input images. In contrast, techniques and mechanisms described herein provide for neural scene representations with excellent visual quality in conjunction with imperfect mesh proxies or no surface-based proxies at all. While providing state-of-the-art visual quality, the inference time of conventional learned models is usually too slow for interactive applications. In contrast, techniques and mechanisms described herein employ deferred neural rendering to extrapolate smooth viewpoints around specular objects like a car while using a casually captured image data input such as a circular video sweep as input.

When using conventional techniques, the reconstruction quality of casually captured data and the chosen scene representation constrain the development of interactive visual experiences, in particular in real-world environments. Traditionally, view synthesis of real-world environments is performed via image-based rendering (IBR), whose quality is mostly limited by the accuracy of the available scene proxy geometry. If red-green-blue-depth ("RGB-D") video is available, conventional techniques may be used to estimate scene properties such as material and environment maps may be estimated, and/or composite Fresnel effects using a physically motivated neural renderer.

Some conventional approaches involving volumetric scene representations such as neural radiance fields ("NeRFs") register all input viewpoints within a learned semi-transparent volume. Such approaches produce trained models with inference times that are prohibitively slow for interactive applications. For example, a sparse neural voxel representation suitable for indoor environments renders 1-2 frames per second. Other conventional approaches such as image translation methods used for image synthesis show temporal artefacts since there is no global registration of the input views, and they cannot be expected to work for non-diffuse scene objects.

According to various embodiments, techniques and mechanisms described herein may facilitate the extrapolation of artificial viewpoints based at least in part on a set of input images.

According to various embodiments, techniques and mechanisms described herein provide for neural scene representations and rendering methods that need not rely on explicit geometry such as posed images or are capable of employing an imperfect proxy geometry. For example, an imperfect proxy geometry may be used to learn how to blend multiple images to mitigate rendering artefacts.

According to various embodiments, techniques and mechanisms described herein provide for training a Generative Adversarial Network (GAN) to learn a mapping from view-dependent neural features to object appearance. The learned features extracted from the neural texture may be interpreted by the generator as a learned surface light field.

In particular embodiments, one or more extensions may be used to provide for improved extrapolation performance. For example, a learning-based technique may be used to interpolate a training corpus. However, learnable components may be added to the deferred rendering pipeline to provide for deferred neural rendering.

According to various embodiments, techniques and mechanisms described herein provide for an end-to-end virtual reality (VR) system that is configured to provide high-quality visual representations that are viewable on multiple target platforms, generated based on a casual capturing procedure. The system may be configured to perform casual creation of real-world VR content, using only a smartphone to obtain color images. An augmented reality app may be used to casually capture a linear light field of a real-world object by recording an outside-in video sweep around the object. Multiplane images may be predicted for a subset of input viewpoints, from which high-quality textured geometry may be extracted, which in turn may be used for real-time image-based rendering suitable for VR. The round-trip time, from guided capture to interactive display, may be 1-2 minutes per scene or less.

According to various embodiments, providing real-world VR experiences may involve capture, reconstruction, and representation of real scenes such that novel viewpoints can be rendered in real-time. Visual results for methods assuming casual capture stages may be achieved by using explicit geometry (e.g. depth maps per input viewpoint obtained from a smartphone's dual camera), or learned representations that can be trained solely on posed images.

Light fields can provide a plenoptic approach for rendering 3D scenes without the need of detailed modeling. Light fields directly encode the visual appearance of a scene as seen from a densely sampled set of input views. Some conventional approaches to casual end-to-end approach based on light fields that do not require any special hardware setup, such as a gantry or a camera rig, rely on hundreds of images to produce high-quality results. Other conventional approaches use a dual camera, which has two important limiting consequences: the capturing time increases, and processing the depth maps into a multilayer mesh representation is sophisticated and time-consuming. Some conventional approaches use multiplane images to create a light field representation consisting of several local light fields associated to the input viewpoints, which are blended together back-to-front to synthesize novel viewpoints. However, the size of a MPI and its inference time both limit the representation from being used in VR.

According to various embodiments, techniques and mechanisms described herein provide for a fast and casual end-to-end system for creating real-world VR experiences while focusing on user-friendly capturing paths, specifically video sweeps in one or more dimensions. MPIs are predicted for a subset of input viewpoints of which high-quality depth maps are extracted and used for a high-quality image-based rendering algorithm suitable for VR.

FIG. 1 illustrates an example of a rendering procedure 100, performed in accordance with one or more embodiments. According to various embodiments, the rendering procedure 100 may be performed at a mobile computing device such as a smart phone, which may both capture images and render one or more novel views. Alternatively, one or more of the operations shown in FIG. 1 may be performed at a remote server in communication with the mobile computing device via a network.

Images of an object such as a vehicle are captured at 102. In some implementations, one or more images may be casually captured, such as by a user holding a smart phone. Alternatively, or additionally, one or more images may be captured from a stationary camera such as a camera mounted at a fixed position or located on a tripod.

A respective pose is determined at 104 for each of the images. According to various embodiments, each pose may identify a directional relation between the object and the position and/or orientation at which the image was captured. For example, each pose may be specified in up to three positional dimensions (e.g., x, y, and z) and/or up to three rotational dimensions (e.g., roll, pitch, and yaw).

The images are used to model the object as a 3D mesh at 106 and/or a UV map at 108 of the object. In some embodiments, the mesh may be constructed as a set of three-dimensional vertices and connections between those vertices that together provide a three-dimensional model of the structure of the object. The term "UV map" refers to a mapping of image data onto a 3D model. The UV map may be created by mapping information from one or more of the images onto the 3D mesh.

According to various embodiments, the pose information determined at 104, the 3D mesh determined at 106, and/or the UV map determined at 108 are provided to a generative adversarial network at 110. The generative adversarial network generates a new, artificial image of the object at 116 by sampling textures at 112 and applying a generator at 114. The artificial image is then fed back in to a discriminator at 120 along with the input images at 118 to optimize the generative adversarial network at 122.

In some implementations, additional information may be provided to the generative adversarial network. Such information may include, but is not limited to, optical center information, position information, and normal information. Such information may be specified on the level of a single pixel or on the level of a group of pixels, for one or more of the input images. Additional details regarding such inputs are described with respect to FIG. 2.

Figure 2:
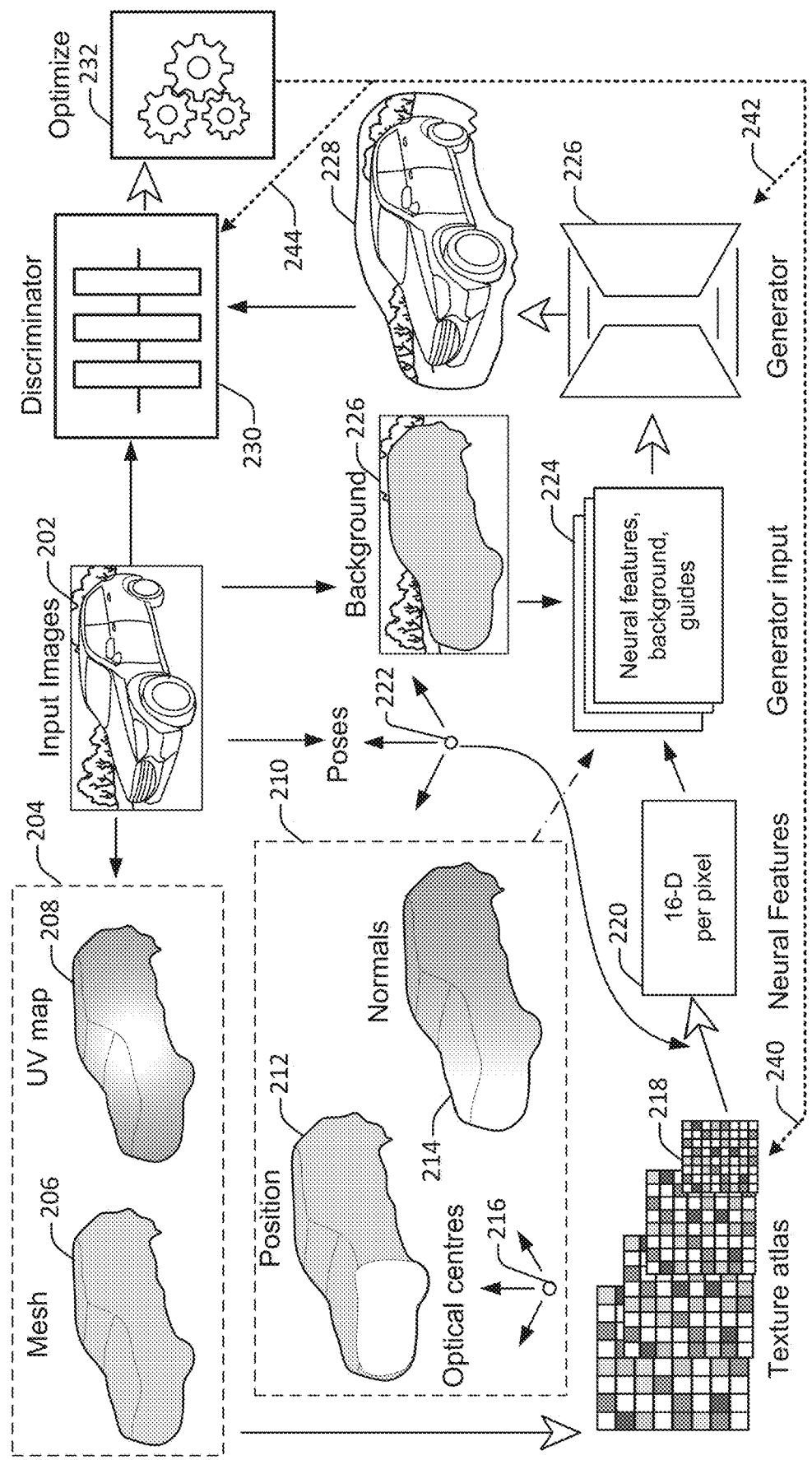
FIG. 2 illustrates an example of a rendering procedure, generated in accordance with one or more embodiments.

FIG. 2 illustrates an example of a rendering procedure 200, generated in accordance with one or more embodiments. According to various embodiments, the rendering procedure 200 may be performed at a mobile computing device such as a smart phone, which may both capture images and render one or more novel views. Alternatively, one or more of the operations shown in FIG. 2 may be performed at a remote server in communication with the mobile computing device via a network.

According to various embodiments, the techniques and mechanisms described with respect to the FIG. 2 may be used instead of or in conjunction with the techniques and mechanisms described with respect to FIG. 1. For instance, one or more operations discussed in FIG. 1 may be shown in additional detail in FIG. 2.

According to various embodiments, various operations related to forward pass and/or back propagation are shown in FIG. 2. Elements 202-214 illustrate techniques related to forward pass machine learning techniques, while elements 216-218 illustrate techniques related to back propagation.

Input images are identified at 202. According to various embodiments, the input images may include a collection of images of the same object captured from different viewpoints. For instance, the input images may be casually captured by an individual using a handheld camera such as a smartphone camera walking around an object such as a vehicle.

According to various embodiments, the input images may be processed and analyzed to determine various types of information for training a generative adversarial neural network. Examples of such information are described below.

In some embodiments, one set of input information 204 may be used to generate a neural texture atlas. For example, one or more input images may be used to generate a 3D mesh 206 of the object. The 3D mesh 206 may be composed of vertices and edges in a three-dimensional space.

In some embodiments, a UV map 208 may be determined for one or more of the input images. The UV-map may be generated by mapping image data onto the 3D mesh from a designated viewpoint. During the training phase, the viewpoint may be, for instance, the pose of the camera identified for one of the input images. During the execution phase, the viewpoint may be, for instance, the camera pose associated with a novel image to be generated. The determination of a viewpoint is discussed with respect to poses 222 below.

In some embodiments, one set of input information 210 may be provided to the generator within the generative adversarial neural network as guides. Various guides may be used, examples of which are described below.

In some embodiments, one type of guide may include position information 212. The position information 212 may indicate a location on the 3D mesh 208 that corresponds with a location on an input image. The correspondence may be determined on the level of the pixel or on the level of a group of pixels. For example, a pixel in the image may correspond with a point within the 3D space. As another example, a group of pixels in the image may correspond with an area within the 3D space.

In some embodiments, one type of guide may include normal information 214. The normal information 214 may identify a normal vector for one or more pixels in the input image. Such information may be provided for some or all of the pixels in the input image. In some embodiments, such information may be provided with pixels in the input image associated with the object. Alternatively, or additionally, normal information may be provided for other parts of the image, such as the background. A normal vector for a pixel or group of pixels may be determined by identifying a vector within the 3D space orthogonal to the 3D mesh at the position identified as discussed with respect to the position information 212.

The neural texture atlas 218 may store information for generating a set of per-pixel multidimensional vectors, referred to herein as neural features. In some embodiments, a neural feature may be implemented as a 16-dimensional texel. Such information may be generated based on the mesh 206 and the UV map 208. The way in which such information is generated may be dynamically determined by the generative adversarial network, as described below.

Neural features f are retrieved from the neural texture atlas at 220. According to various embodiments, neural features may be retrieved by using pose information 222 to identify the neural features from the neural texture atlas. According to various embodiments, a pose 222 may identify the position and orientation of the camera with respect to the object in the image. For example, a pose may include one or more positional dimensions such as x, y, and z, as defined in the three-dimensional space in which the three-dimensional mesh 206 is positioned. As another example, a pose may include one or more orientation dimensions such as roll, pitch, and yaw, which identify the camera's orientation within the three-dimensional space.

In some embodiments, during the training phase, the viewpoint may be, for instance, the pose of the camera identified for one of the input images. During the execution phase, the viewpoint may be, for instance, the camera pose associated with a novel image to be generated.

According to various embodiments, the pose may be may be converted to spherical harmonics. For example, the first 2 bands are used, e.g. 9 coefficients, which may be multiplied with the neural texel channels 4-12 of f.

According to various embodiments, the pose may be used to determine a location and orientation of the 3D mesh with respect to the camera position, which may in turn be used to determine a UV-map that maps pixel locations on the image (either the input image or the novel image to be created) to particular locations on the 3D mesh. The 3D mesh locations may then be used as coordinates to update or retrieve neural textures in the neural texture atlas.

The retrieved neural texels (also referred to herein as neural features) are included as generator input at 224. Generator input may also include components such as background information 226 and/or guides 210. According to various embodiments, during the training phase, a background for an image may be created at 226 by eroding the UV-map from the training image I.

The generative adversarial network includes a generator component 226 and a discriminator component 230 that act as "adversaries." The generator 226 uses the generator input 224 to generate an image 228 from the designated camera pose. During the training phase, the camera pose is the same as one of the input images. The generated image 228 is then provided to the discriminator 230, along with the corresponding input image from the input images 202. The discriminator 230 then attempts to identify differences between the input image from 202 and the generated image 228. The output of the discriminatory is used to optimize the generative adversarial network at 232. This output is provided back to the discriminator 230 itself, to the generator at 242, and to the neural texture atlas at 240 to update the neural features.

In some implementations, training the generative adversarial neural network may involve attempting to find a combination of neural texture T and neural renderer R that minimizes the image re-rendering loss L over the training dataset D of M posed images created from the capture, where $\mathcal{D} = (I_k, p_k)_{k=1}^M$. As used in these equations, $I_k$ is the k-th image of the training dataset and $p_k$ its corresponding camera pose. That is, $p_k$ identifies a viewing direction v and optical center c for the k-th image of the training dataset. The optimal neural texture T* and renderer R* may be obtained by solving:

$$\mathcal{T}^*, \mathcal{R}^* = \underset{\mathcal{T}, \mathcal{R}}{\arg\min} \sum_{d \in \mathcal{D}} \mathcal{L}(A(d) | F_d(\mathcal{T}), G_d(\mathcal{R})). \quad (1)$$

In some implementations, the baseline may be obtained by setting $F_d(\bullet) = G_d(\bullet) = i_d$. The augmentation operator ($\bullet$) may return image crops during training and its input during testing (i.e. identity). Various extensions address (i) aug- menting training samples $d \in D$, (ii) adding inputs to the renderer R, and/or (iii) injecting noise to the view-dependent and thus dataset-dependent feature generation F ($\bullet$) and/or the generator guides ($\bullet$).

According to various embodiments, back propagation may be used to improve the model. For example, at 240, the atlas A may be updated to keep view-dependent (e.g., specular) texels on finer level, for instance by regressing neural feature channels f [0:2] with the training image I. Such an approach may help to provide an estimate of the diffuse color of the surface. As another example, at 242, the generator may be updated via loss between the generated output O and data item image I. As yet another example, at 244, the discriminator may be updated.

According to various embodiments, one or more extensions may be employed. For example, a guided augmentation procedure ($\bullet$) may focus on poorly inferred image regions when fetching dataset items d leading to more efficient training. SSIM may be used to determine these image regions. As another example, additional viewpoint information may be added to the generator input, such as optical centers, positions, and/or normals. As yet another example, noise may be added to viewing directions v and newly added guidance signal of the generator input Gd. The noise injected into the viewing directions v may significantly reduce extrapolation artifacts.

In some embodiments, the optical center of an image may be the location and orientation of the camera that captures the image. For instance, the optical center within the camera may represent the point in which all the light rays that form the image intersect if the lens is approximated with a single thin lens. The optical center may be determined by positioning an image in three-dimensional space, such as the three-dimensional coordinate space in which the three-dimensional mesh is located.

In some implementations, one or more techniques may be employed to reduce temporal flickering. For example, a more accurate proxy geometry may be provided. As another example, the image density may be increased. As yet another example, an extrapolated viewpoint may be generated closer to the input viewpoints.

According to various embodiments, techniques and mechanisms described herein may interpolate a training corpus. Alternately, or additionally, other neural scene representations such as neural radiance fields ("NeRFs") may be used. In general, extrapolation may cause uncertainty and thus noise, which may be traded with blur in accordance with techniques and mechanisms described herein. In some embodiments, more object and scene information may be incorporated into the process, and/or neural scene representations may be inpainted for view extrapolation tasks.

Figure 3:
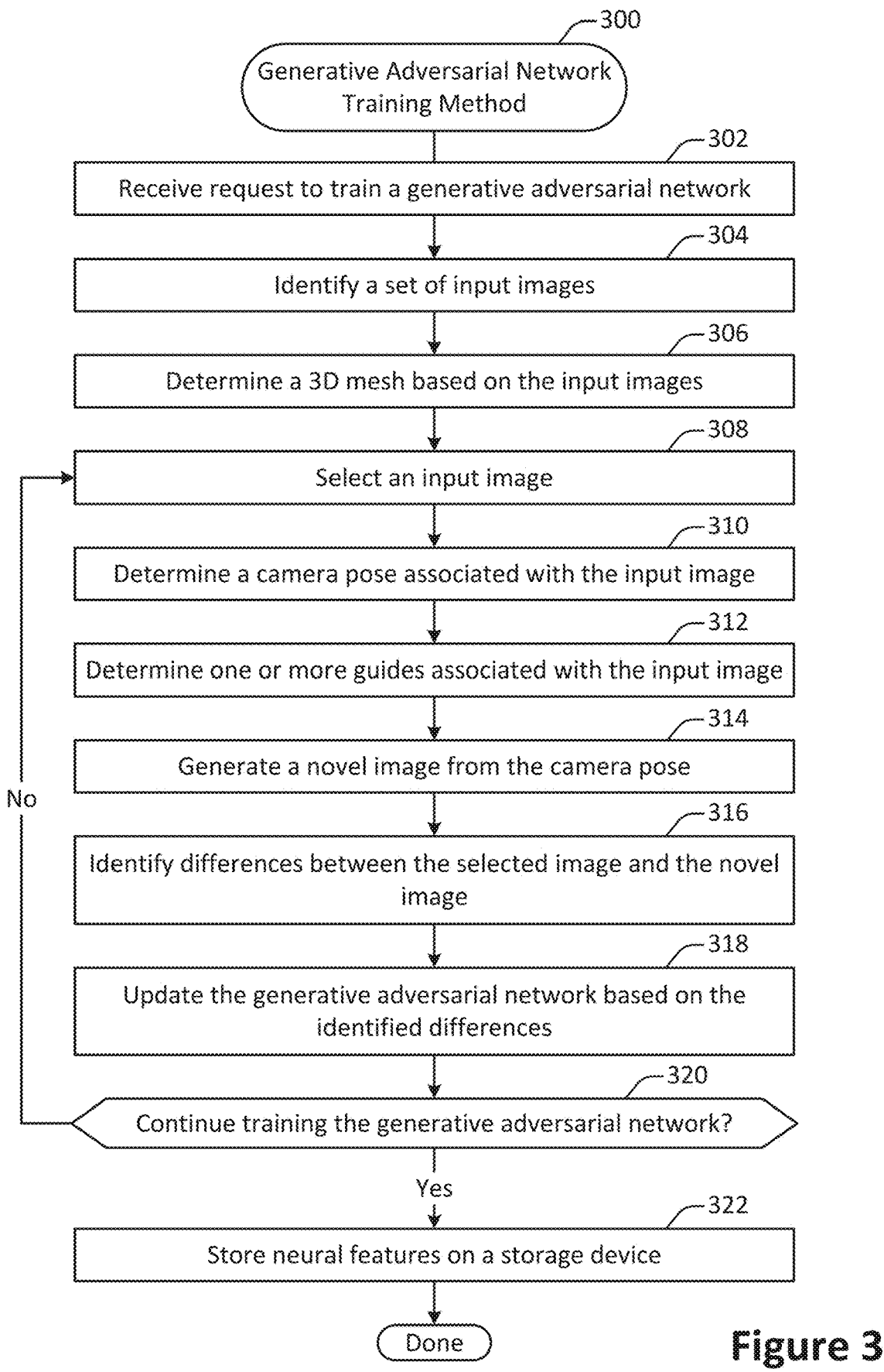
FIG. 3 illustrates a method for training a generative adversarial network, performed in accordance with one or more embodiments.

FIG. 3 illustrates a method 300 for training a generative adversarial network, performed in accordance with one or more embodiments. According to various embodiments, the method 200 may be performed at a mobile computing device such as a smart phone, which may both capture images and render one or more novel views. Alternatively, one or more of the operations shown in FIG. 3 may be performed at a remote server in communication with the mobile computing device via a network.

According to various embodiments, the method 300 represents a more general view of techniques and mechanisms described in greater detail with respect to FIG. 1 and FIG. 2. Accordingly, some operations in FIG. 3 are described with reference to information already included with respect to FIGS. 1 and 2.

A request to train a generative adversarial network is received at 302. According to various embodiments, the request may be generated based on user input. Alternatively, or additionally, the request may be generated automatically, for instance when a designated number of input images are captured.

Input images are identified at 304. According to various embodiments, the input images may be captured by any suitable camera, such as one or more cameras in a smart phone on which the method 300 is performed. The input images may be captured by, for instance, a user walking around an object such as a vehicle while holding the camera.

A 3D mesh is determined at 306 based on the images. According to various embodiments, the 3D mesh may be determined by identifying an object in the images and then constructing a 3D mesh composed of vertices and lines in a 3D space. The input images may include a set of two dimensional images of an object each captured from a respective camera pose.

In some embodiments, additional information may be included along with the input images, which may be used to assist in the generation of the 3D mesh, and/or in the performance of other operations. Such information may include, but is not limited to: gyroscopic data, accelerometer data, GPS data, depth camera information, and information captured by multiple cameras (e.g., on a smart phone) from the same location.

An input image is selected at 308 According to various embodiments, input images may be selected in any suitable order. Each image in the input set may be used to train the generative adversarial network any number of times. For instance, some images may be used for training purposes, while others may be ignored. At the same time, some images may be used potentially many times.

In particular embodiments, images may be selected based on the loss function of the discriminator. For example, an input image associated with larger differences from the generated image may be selected for more frequent use.

A camera pose associated with the input image is determined at 310. According to various embodiments, the camera pose may be determined as part of the 3D mesh construction process. For instance, as part of this process, different images may be connected by identifying fiducial points (e.g., vehicle door handles or headlights) that appear in more than one image. By holding fixed those points in 3D space, other aspects of the images may also be correlated, and the results used both to determine the 3D mesh and to determine the pose of an image relative to the object represented by the 3D mesh. As discussed herein, a pose may be specified in up to 6 dimension (e.g., x, y, z, roll, pitch, and yaw).

One or more guides associated with the input image are determined at 312. As discussed herein, such as with respect to FIG. 2, guides may include information such as position data, normal data, and optical center data. Such information may be provided to the image generator as an input.

A novel image is generated from the camera pose at 314. The novel image may be generated based on the guides determined at 312, neural feature information, and/or any other suitable information. The types of input that may be used are discussed in additional detail with respect to FIGS. 1 and 2.

Any differences between the selected image and the novel image are identified at 316. According to various embodiments, the differences may be identified by a discriminator that attempts to distinguish between the novel image and an input image. The generative adversarial network is updated at 318 based on the identified differences. The implementation of a generator and the updating of a generative adversarial network based on its output are discussed in additional detail with respect to FIG. 2.

A determination is made at 320 as to whether to continue training the generative adversarial network. According to various embodiments, training may cease when one or more conditions are met. For example, training may cease after a designated period of time. As another example, training may cease after differences between the input images and the generated images have decreased below a designated threshold. As yet another example, training may cease based on user input. When training is finished, the neural features that have been trained are stored on a storage device. In addition to the neural features, information such as the guides determined at 312 may also be stored.

According to various embodiments, once trained, the generative adversarial network may then be used to generate artificial images of the object that differ from the input images. For example, artificial (also referred to herein as synthetic or novel) images may be generated from viewpoints different from any of the input images captured.

In particular embodiments, techniques and mechanisms described herein may be employed in a physically motivated manner. For example, the system may be integrated with a differentiable rendering engine, which may learn to identify one or more components needed for real-time photo-real view synthesis.

Figure 4:
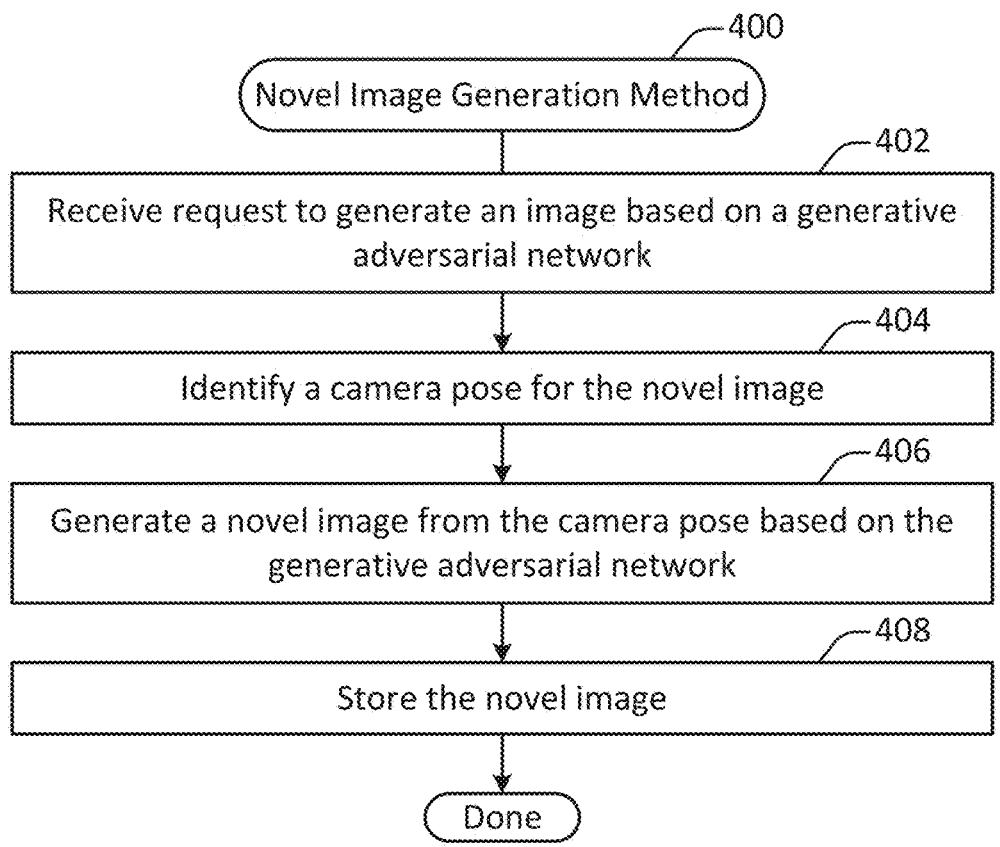
FIG. 4 illustrates a novel image generation method, performed in accordance with one or more embodiments.

FIG. 4 illustrates a novel image generation method 400, performed in accordance with one or more embodiments. The method 400 may be performed on any suitable computing device to generate a novel image based on a generative adversarial network trained as described herein.

A request to generate a novel image is received at 402. The request may be generated based on user input, or may be generated automatically. For instance, the request may be generated by an application as a user moves a camera view perspective within a virtual space.

A camera pose for the novel image is identified at 404. In some implementations, the camera pose may be identified based on the request received at 402. For instance, the user may navigate an application to position a virtual camera at a particular location with respect to an object. As an alternative, a virtual camera may be moved through space along a track, for instance to generate a movie of an object.

A novel image is generated from the camera pose based on the generative adversarial network at 406, and stored on a storage device at 408. According to various embodiments, generating the novel image may involve providing the viewpoint to the generator trained as described with respect to FIGS. 1 and 2.

Figure 5:
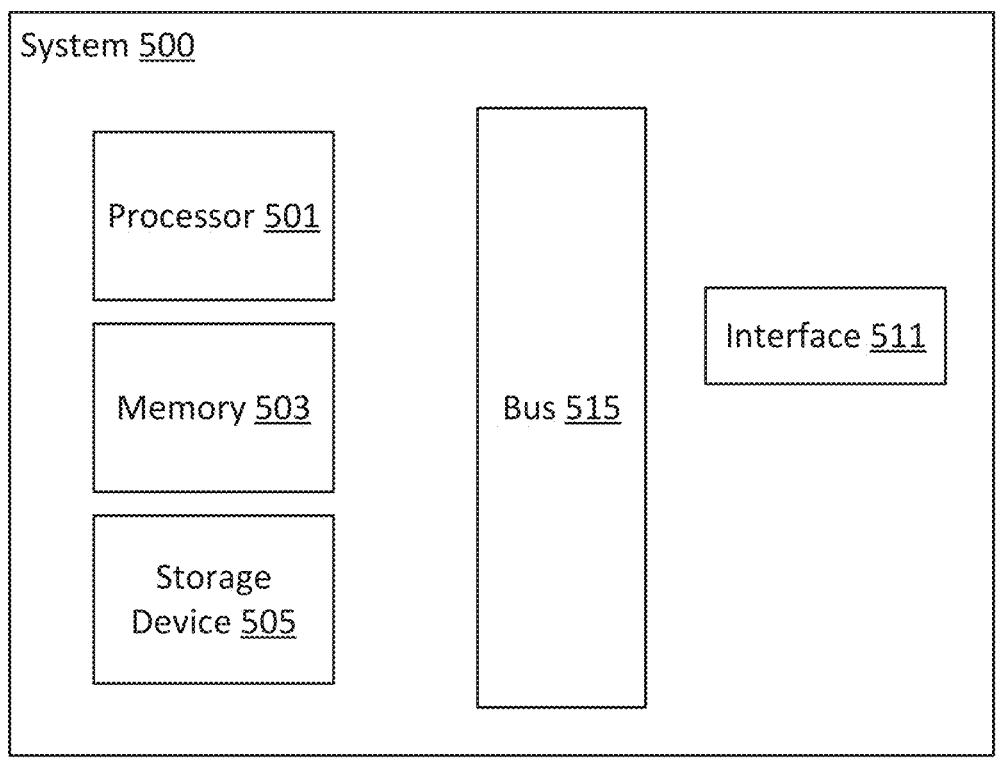
FIG. 5 illustrates one example of a computing device.

FIG. 5 illustrates one example of a computing device. According to various embodiments, a system 500 suitable for implementing embodiments described herein includes a processor 501, a memory module 503, a storage device 505, an interface 511, and a bus 515 (e.g., a PCI bus or other interconnection fabric.) System 500 may operate as variety of devices such as artificial image generator, or any other device or service described herein. Although a particular configuration is described, a variety of alternative configurations are possible. The processor 501 may perform operations such as those described herein. Instructions for performing such operations may be embodied in the memory 503, on one or more non-transitory computer readable media, or on some other storage device. Various specially configured devices can also be used in place of or in addition to the processor 501. The interface 511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 6:
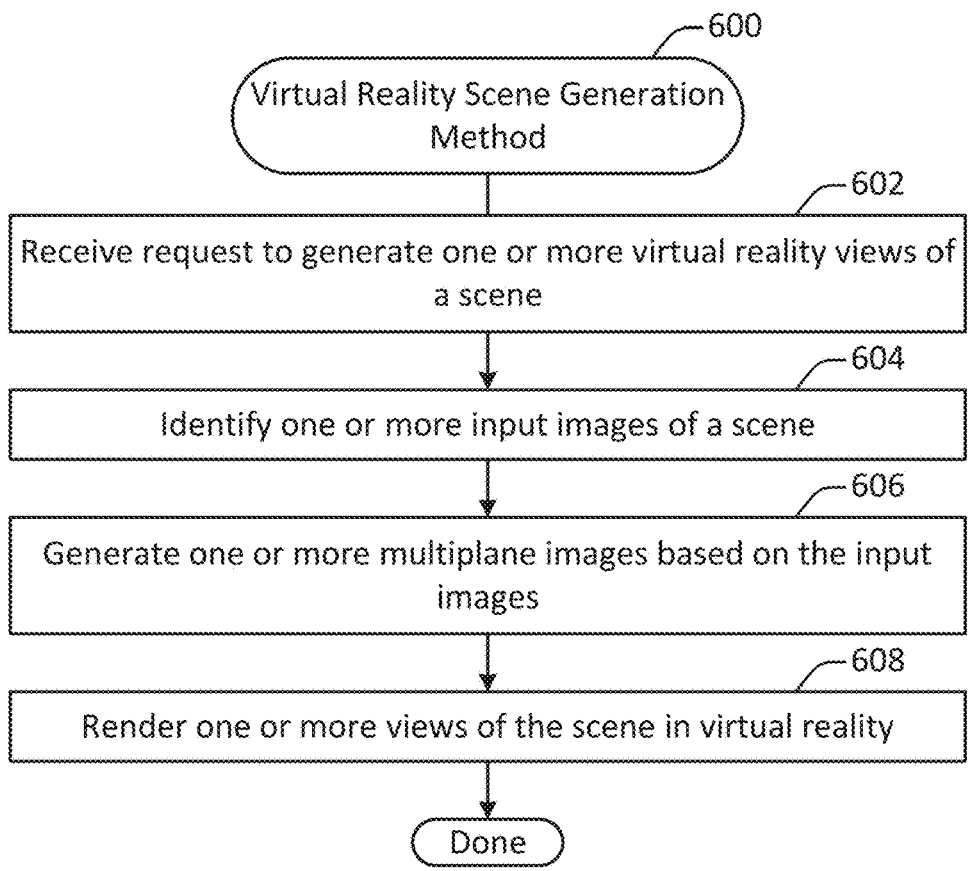
FIG. 6 illustrates a method for generating one or more virtual reality views of a scene, performed in accordance with one or more embodiments.

FIG. 6 illustrates a method 600 for generating one or more virtual reality views of a scene based on one or more input images. According to various embodiments, the method 600 may be performed on a mobile computing device such as a smartphone.

According to various embodiments, the system may proceed in three stages: capture, processing and rendering. An application on a smartphone may be used to facilitate capture. The application may guide the user with augmented reality markers. The processing may be performed on a smartphone, a local computing device, a remote server, or a combination thereof. The processing may involve consuming the captured images and producing a scene representation. The results may be viewed on any suitable platform, such as an OpenGL-based viewer for directly visualizing results on a desktop or laptop, or a Unity-based viewer for VR rendering using a device such as an Oculus Rift S headset.

A request is received to generate one or more virtual reality views of a scene at 602. According to various embodiments, the request may be received at a user interface of a computing device such as a smartphone on which is implemented an application configured to perform one or more operations described herein.

One or more input images of a scene are captured at 604. According to various embodiments, the one or more input images may be captured via a guided capture process through which a user is guided to capture images of the scene from particular viewpoints. An example of a user interface facilitating such a guided image capture process is shown in FIG. 7.

Figure 7:
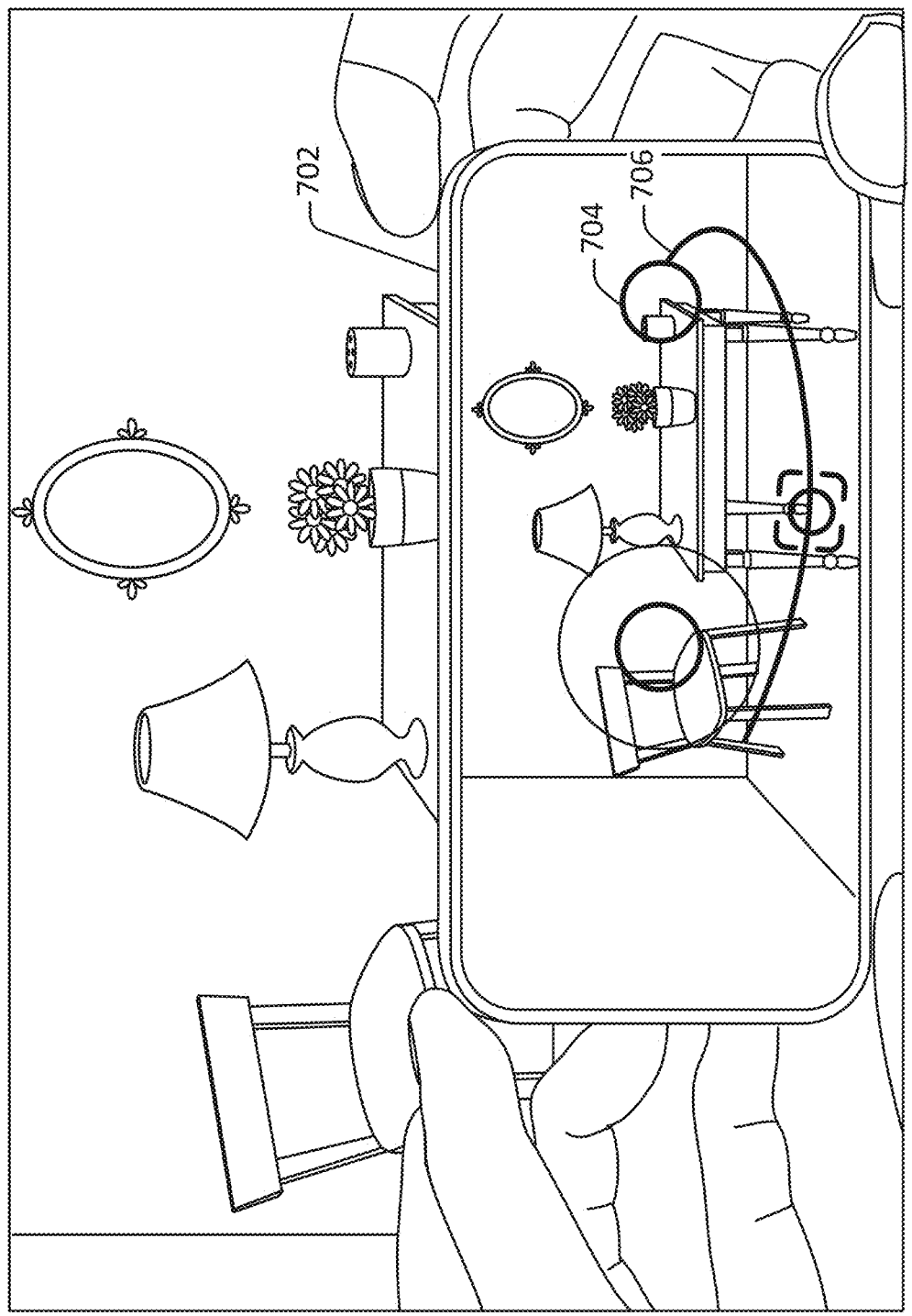
FIG. 7 illustrates a user interface facilitating a guided image capture process, generated in accordance with one or more embodiments.

In FIG. 7, an augmented reality application guides a user through the casual capturing process. For example, an application running on the smartphone 702 may present various guides, such as the guide 704, that guide the user in positioning the camera to capture a desired image.

According to various embodiments, an application may guide the user along a ringlike trajectory, such as the trajectory 706, around an object of interest using augmented reality markers. In some configurations, sample input frames may be sparsely sampled from a video, for instance following the sampling theory described by Mildenhall, Srinivasan, Ortiz-Cayon, Kalantari, Ramamoorthi, Ng, and Kar, titled "Local Light Field Fusion: Practical View Synthesis with Prescriptive Sampling Guidelines." ACM Trans. Graph. 38, 4, Article 29 (July 2019), which is hereby incorporated by reference in its entirety and for all purposes, and which proposed a bound for sampling views of a scene while still reliably reconstructing the desired multiplane images.

In particular embodiments, one or more 1D video sweeps (e.g., a ring-like 360-degree or partial arc trajectory) may be used to keep the process itself as user-friendly and casual as possible. Alternatively, a 2D grid of viewpoints may be captured to provide for additional data.

Figure 8:
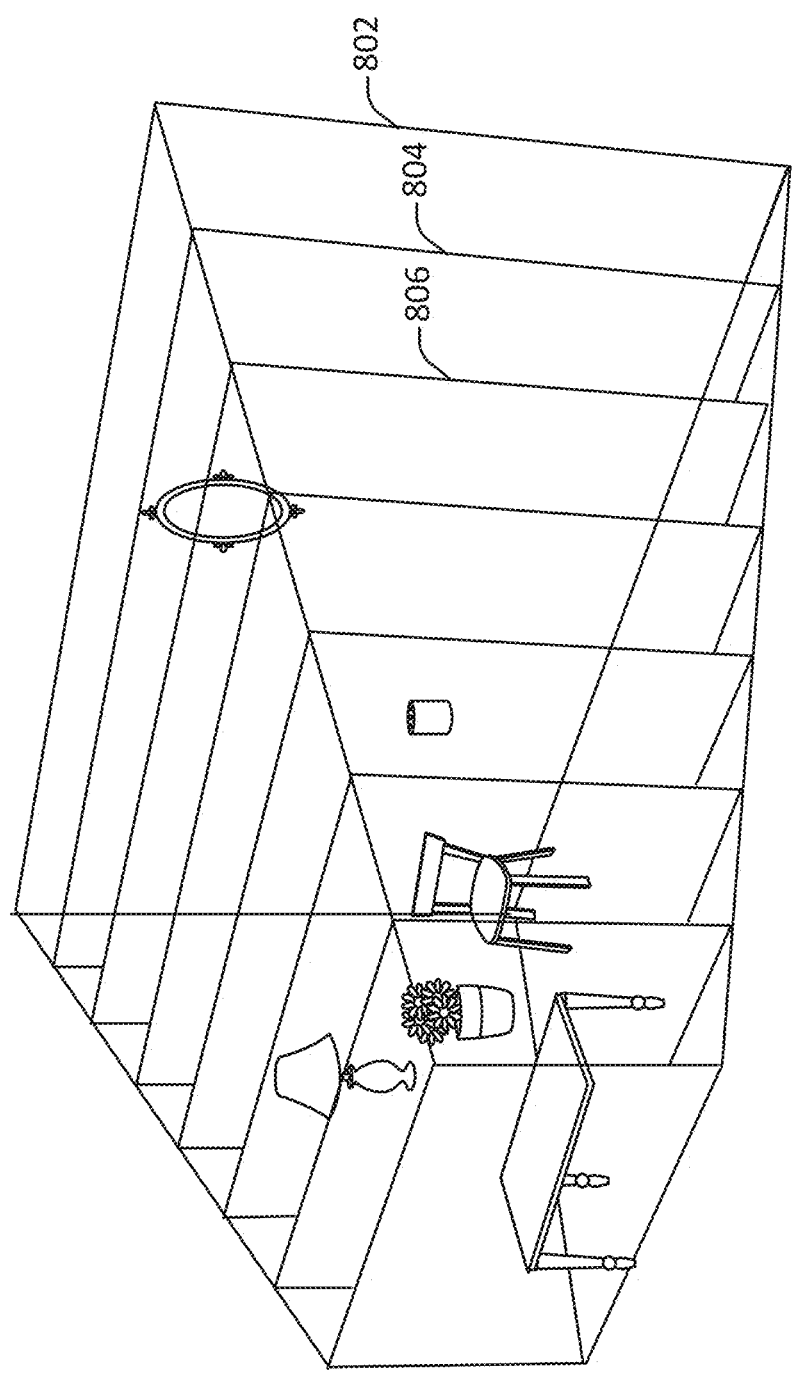
FIG. 8 illustrates an example of a multiplane image, generated in accordance with one or more embodiments.

Returning to FIG. 6, one or more multiplane images of the scene are generated at 606. According to various embodiments, each multiplane image of the scene may separate the elements in the scene into different depth planes, with each depth plane corresponding to a respective distance from the camera to the elements located in that depth plane. An example of a multiplane image is shown in FIG. 8.

According to various embodiments, to provide a scene representation, the captured scene may be represented as a set of multiplane images (MPIs). A neural network may promotes a subset of input viewpoints to multiplane images, from which high-quality geometry is extracted per view for faster rendering. An MPI consists of D parallel planes, such as the planes 802, 804, and 806, with RGBα textures, as illustrated in FIG. 8. MPIs can be considered as light fields with local partial geometry. Any suitable number of layers may be used. For instance, 64 layers may be used.

According to various embodiments, the processing may include various steps for converting sample input views to RGBD images for efficient rendering: (1) camera poses may be computed using a structure-from-motion technique, (2) an MPI may be predicted for each sampled image using a 3D convolutional neural network, and (3) depth maps may be computed from the predicted MPIs, which may be used in our rendering stage.

In particular embodiments, one or more assumptions about the capture trajectory may be used to initialize a structure-from-motion system and to provide priors to the bundle-adjustment problem. The number of keypoints, iterations, and other optimization parameters may be strategically determined so as to achieve acceptable results while keeping the system sufficiently fast. According to various embodiments, any of a variety of techniques may be used to predict the MPIs, such as Mildenhall et al.'s pretrained network. This network may be trained on synthetic data or real training examples, for instance to increase the quality of MPIs for real scenes. Depth maps may be computed from MPIs using a weighted summation of the depth of each layer, weighted by the MPI's per-pixel α values.

Figure 9:
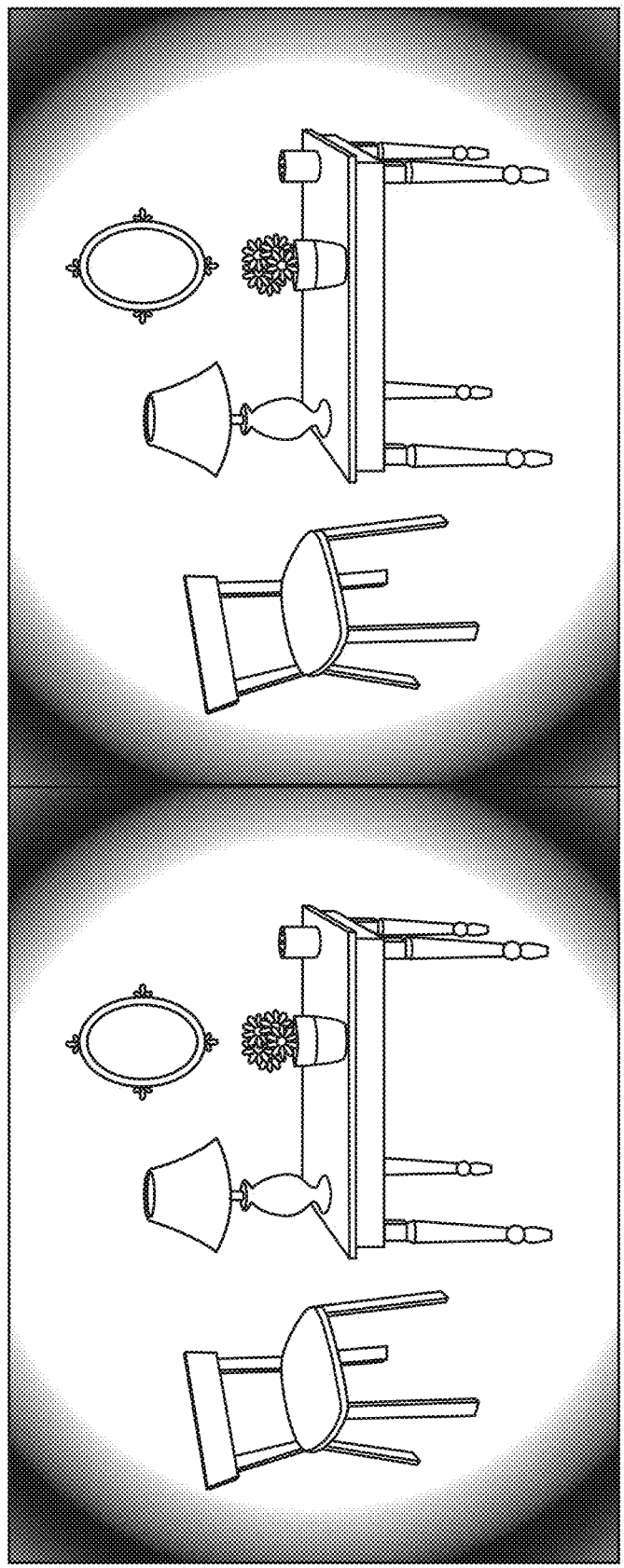
FIG. 9 illustrates an example of a virtual reality view of a scene, generated in accordance with one or more embodiments.

Returning to FIG. 6, one or more views of the scene are rendered in virtual reality at 608. The rendering may be performed in real time or near-real time. According to various embodiments, a view of the scene may be rendered in virtual reality by determining two nearby virtual reality perspectives. The two nearby virtual reality perspectives may each correspond with a position of a virtual human eye from which the scene may be viewed. One or both of the virtual reality view perspectives may be generated from a novel viewpoint by using multiplane images captured from camera poses near to the virtual reality view perspective. An example of a virtual reality view of a scene is shown in FIG. 9.

According to various embodiments, the viewpoints from which to generate the virtual reality views of the scene may be determined based on user input. For instance, a user may navigate a virtual reality world, with images being automatically updated to reflect the user's virtual positioning. Alternatively, or additionally, a virtual reality video of a scene may be generated by providing a set of target virtual reality perspectives from which to generate the views.

According to various embodiments, a novel view for including in a virtual reality scene may be rendered from one or more MPIs by re-projecting the MPI layers into the novel view and compositing them from back-to-front. Views may be rendered by blending contributions of neighboring views (e.g., 4 for each eye). However, rendering a single stereoframe may involve a large number of render passes (e.g., N×D=512), which may severely limit the rendering performance. Accordingly, the system may instead use the depth maps extracted from the MPIs to create a per-view geometry and render individual contributions from the neighboring input views.

According to various embodiments, for a given posed input view, the system may create a dense triangulated mesh assigning a vertex to the center of each pixel and back-project its depth to world space. For memory efficiency, the geometry of each view may be created at rendering time. For example, the system may reuse a vertex buffer object with vertices on a 2D grid while depth may be uploaded to a vertex buffer on demand.

In particular embodiments, rendering may produce rendering artifacts because some triangles may be excessively stretched at depth discontinuities. To reduce this effect during blending, the contribution of those regions may be penalized, for instance with the inverse of the area stretching factor, which is the amount that a pixel is stretched under re-projection. The pixel area stretching factor may be computed as the determinant of the Jacobian matrix of texture coordinate. Contributions may be weighted by proximity to the novel view, penalizing contributions from far-away input views.

According to various embodiments, techniques and mechanisms described herein provide for a fast and reliable end-to-end system for casually creating and displaying real-world VR experiences. The guided capturing may determine the efficiency of the system and the representation provides theoretical guarantees that the final representation will perform sufficiently well. That is, sufficiently good MPIs for the given datasets for further generation of per-view depth maps are provided.

In particular embodiments, the procedure can be adjusted to the requirements of different target platforms, for instance by decreasing image or depth map resolution to speed up transmission and rendering, thus making interaction even more appealing.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
generating a plurality of novel images using an image generator implemented on a processor, the image generator receiving as input a plurality of neural features selected from a neural texture atlas, the image generator also receiving as input one or more position guides identifying position information for a plurality of input image pixels, wherein the one or more position guides includes normal information, the normal information identifying a normal vector for one or more pixels in the plurality of input image pixels;
evaluating the plurality of novel images using an image discriminator implemented on the processor to determine a plurality of optimization values, the image discriminator comparing each of the plurality of novel images with a respective one of a corresponding plurality of input images, each of the plurality of novel images being generated from a respective camera pose relative to an object identical to that of the respective one of the plurality of input images;
updating the image generator and the neural features based on the optimization values; and
storing the updated neural features on a storage device, the updated neural features supporting the generation of a designated novel image from a designated camera pose different from any of the plurality of input images.

2. The method recited in claim 1, wherein image generator receives as input a plurality of background images, each of the plurality of background images associated with a respective one of the plurality of input images.

3. The method recited in claim 2, the method further comprising:
generating the plurality of background images by removing the object from the plurality of input images.

4. The method recited in claim 1, wherein the image generator receives as input a three-dimensional mesh representing the object in a three-dimensional coordinates space.

5. The method recited in claim 4, the method further comprising:
generating the three-dimensional mesh based on the plurality of input images.

6. The method recited in claim 4, wherein the one or more position guides includes a respective plurality of normal vectors for a designated one of the input images, each of the normal vectors identifying a three-dimensional direction orthogonal to a surface of the three-dimensional mesh at a respective position in the three-dimensional coordinate space.

7. The method recited in claim 4, wherein the one or more position guides includes a respective plurality of position values for a designated one of the input images, each of the plurality of position values identifying a position in the three-dimensional coordinate space associated with a respective pixel position in the designated input image.

8. The method recited in claim 4, wherein the one or more position guides includes an optical center associated with a designated one of the input images, the optical center indicating an approximate location in the three-dimensional coordinate space at which light rays that form the designated input image intersect.

9. The method recited in claim 4, wherein generating the plurality of novel images comprises determining a plurality of uv-maps, each of the uv-maps providing a correspondence between pixel locations in a respective one of the novel images and locations in the neural texture atlas.

10. The method recited in claim 1, the method further comprising:
updating the image discriminator based on the optimization values.

11. The method recited in claim 1, wherein each neural feature includes a plurality of values.

12. The method recited in claim 1, wherein together the image generator and the image discriminator form a generative adversarial network.

13. A system comprising:
an image generator implemented on a processor and configured to generate a plurality of novel images, the image generator receiving as input a plurality of neural features selected from a neural texture atlas, the image generator also receiving as input one or more position guides identifying position information for a plurality of input image pixels, wherein the one or more position guides includes normal information, the normal information identifying a normal vector for one or more pixels in the plurality of input image pixels;
an image discriminator implemented on the processor and configured to evaluate the plurality of novel images to determine a plurality of optimization values, the image discriminator comparing each of the plurality of novel images with a respective one of a corresponding plurality of input images, each of the plurality of novel images being generated from a respective camera pose relative to an object identical to that of the respective one of the plurality of input images; and
a storage device configured to store updated neural features, the updated neural features and the image generator being updated based on the optimization values, the updated neural features supporting the generation of a designated novel image from a designated camera pose different from any of the plurality of input images.

14. The system recited in claim 13, wherein the one or more position guides includes a plurality of background images, each of the plurality of background images associated with a respective one of the plurality of input images.

15. The system recited in claim 13, wherein the image generator receives as input a three-dimensional mesh representing the object in a three-dimensional coordinates space.

16. The system recited in claim 15, wherein the one or more position guides includes a respective plurality of normal vectors for a designated one of the input images, each of the normal vectors identifying a three-dimensional direction orthogonal to a surface of the three-dimensional mesh at a respective position in the three-dimensional coordinate space.

17. The system recited in claim 15, wherein the one or more position guides includes a respective plurality of position values for a designated one of the input images, each of the plurality of position values identifying a position in the three-dimensional coordinate space associated with a respective pixel position in the input image.

18. The system recited in claim 15, wherein the one or more position guides includes an optical center associated with a designated one of the input images, the optical center indicating an approximate location in the three-dimensional coordinate space at which light rays that form the designated input image intersect.

19. The system recited in claim 15, wherein generating the plurality of novel images comprises determining a plurality of uv-maps, each of the uv-maps providing a correspondence between pixel locations in a respective one of the novel images and locations in the neural texture atlas.

20. One or more non-transitory computer readable media having instructions stored thereon for performing a method, the method comprising:
generating a plurality of novel images using an image generator implemented on a processor, the image generator receiving as input a plurality of neural features selected from a neural texture atlas, the image generator also receiving as input one or more position guides identifying position information for a plurality of input image pixels, wherein the one or more position guides includes normal information, the normal information identifying a normal vector for one or more pixels in the plurality of input image pixels;
evaluating the plurality of novel images using an image discriminator implemented on the processor to determine a plurality of optimization values, the image discriminator comparing each of the plurality of novel images with a respective one of a corresponding plurality of input images, each of the plurality of novel images being generated from a respective camera pose relative to an object identical to that of the respective one of the plurality of input images;
updating the image generator and the neural features based on the optimization values; and
storing the updated neural features on a storage device, the updated neural features supporting the generation of a designated novel image from a designated camera pose different from any of the plurality of input images.

* * * * *